(12) United States Patent
Amin et al.

(10) Patent No.: US 12,735,319 B2
(45) Date of Patent: Sep. 15, 2026

(54) METHODS AND COMPOSITIONS FOR HIGHLY PURIFIED BORON NITRIDE NANOTUBES

(71) Applicant: College of William & Mary, Williamsburg, VA (US)

(72) Inventors: Mahmoud S. Amin, Fremont, CA (US); David E. Kranbuehl, Williamsburg, VA (US); Hannes C. Schniepp, Williamsburg, VA (US)

(73) Assignee: College of William & Mary, Williamsburg, VA (US)

( * ) Notice: Subject to any disclaimer, the term of this patent is extended or adjusted under 35 U.S.C. 154(b) by 410 days.

(21) Appl. No.: 18/592,873

(22) Filed: Mar. 1, 2024

(65) Prior Publication Data

US 2024/0286900 A1 Aug. 29, 2024

Related U.S. Application Data

(62) Division of application No. 16/745,175, filed on Jan. 16, 2020, now abandoned.

(60) Provisional application No. 62/793,621, filed on Jan. 17, 2019.

(51) Int. Cl.

*C01B 21/064* (2006.01)
*B82Y 30/00* (2011.01)
*B82Y 40/00* (2011.01)

(52) U.S. Cl.

CPC .......... *C01B 21/0648* (2013.01); *B82Y 30/00* (2013.01); *B82Y 40/00* (2013.01); *C01P 2002/74* (2013.01); *C01P 2002/82* (2013.01); *C01P 2004/03* (2013.01); *C01P 2004/13* (2013.01)

(58) Field of Classification Search

None
See application file for complete search history.

(56) References Cited

U.S. PATENT DOCUMENTS 4,997,633 A * 3/1991 Koshida .............. C01B 21/0648 423/406
8,734,748 B1 * 5/2014 Hung .................... B82Y 30/00 423/276
9,487,402 B2 * 11/2016 Culha ................. C01B 21/0648
11,629,054 B2 4/2023 Dushatinski
12,172,889 B2 * 12/2024 Simard ............... C01B 21/0648
2023/0286801 A1 * 9/2023 Dushatinski ........... C01B 35/08

(Continued)

OTHER PUBLICATIONS

Ghiassi et al.; Surface Modification and Functionalization of Boron Nitride Nanotubes via Condensation with Saturated and Unsaturated Alcohols for High Performance Polymer Composites; ACS Appl. NanoMater., 2, 4053-4060, 2019.*

(Continued)

*Primary Examiner* — Guinever S Gregorio
(74) *Attorney, Agent, or Firm* — Jason P. McDevitt

(57) ABSTRACT

Herein we describe purified boron nitride nanotube compositions substantially free from hexagonal boron nitride. The compositions have a mass ratio of boron nitride nanotubes to hexagonal boron nitride of at least 100. Methods are provided for producing purified boron nitride nanotube compositions wherein impure compositions are subjected to heating with a $C_5$ to $C_{11}$ hydrocarbon solvent under specified conditions.

5 Claims, 4 Drawing Sheets

(56) References Cited

U.S. PATENT DOCUMENTS

2024/0092998 A1* 3/2024 Ikeda .................. C01B 21/0648
2024/0286899 A1* 8/2024 Daiki .................... C01B 21/064

OTHER PUBLICATIONS

Serizawa et al.; Chem. Commun., 51, 7104-7107, 2015.*
Fay et al.; Nanoscale, 8, 4348-4359; 2016.*
Williams et al.; Purification of boron nitride nanotubes; Chemical Physics Letters 425, 315-319; 2006.*
KR20220128856A; Google Translation Jun. 10, 2026.*
Adnan et al., "Extraction of Boron Nitride Nanotubes and Fabrication of Macroscopic Articles Using Chlorosulfonic Acid", Nano Letters (2018), 18 (3), p. 1615-1619, DOI: 10.1021/acs.nanolett.7b04335.

* cited by examiner

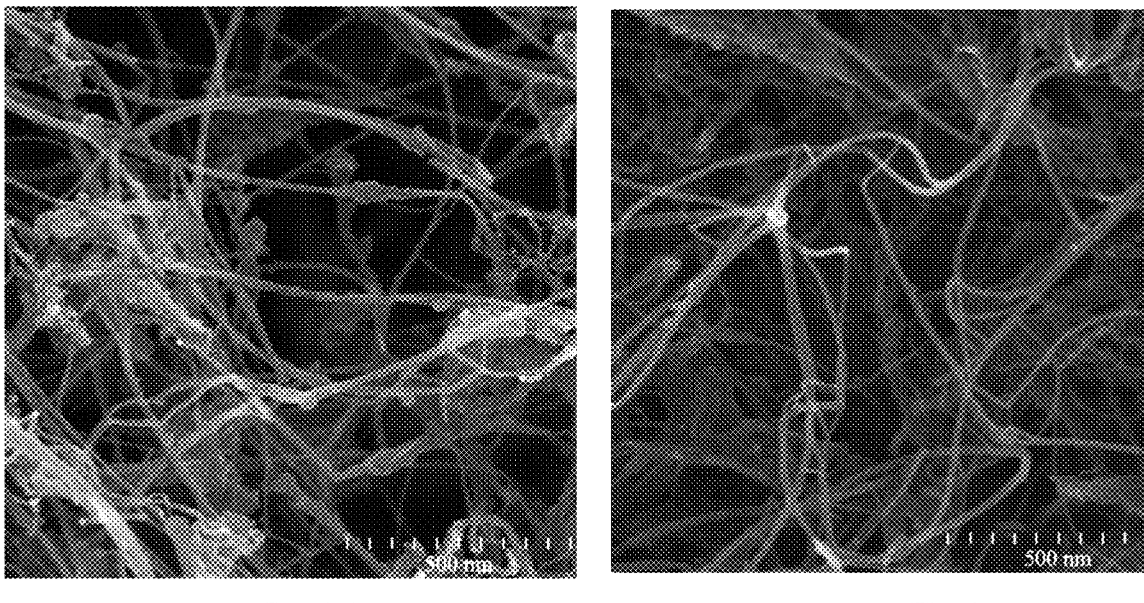
FIG. 1A
FIG. 1B
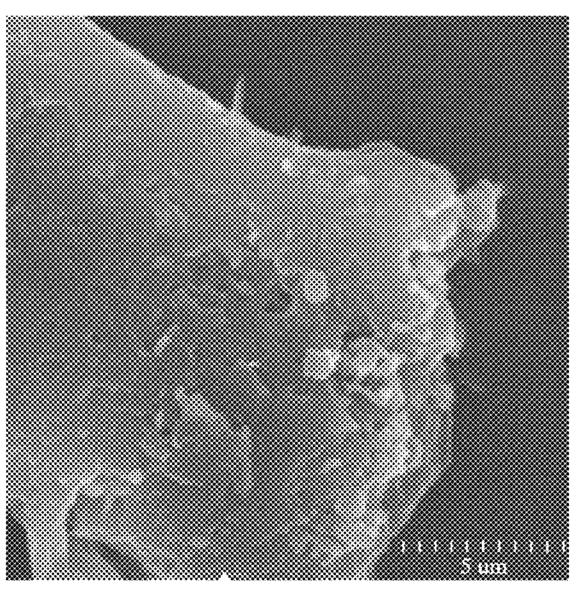
FIG. 1C
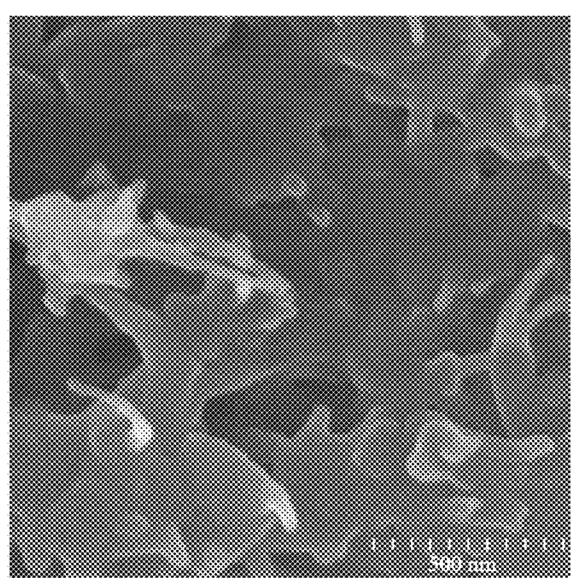
FIG. 1D

METHODS AND COMPOSITIONS FOR HIGHLY PURIFIED BORON NITRIDE NANOTUBES

CROSS-REFERENCE TO RELATED APPLICATIONS

The present application is a divisional of U.S. patent application Ser. No. 16/745,175, filed Jan. 16, 2020, which claims priority under 35 U.S.C. § 119(e) to U.S. Provisional Patent Application No. 62/793,621, filed Jan. 17, 2019. The disclosure of each application is incorporated by reference herein in its entirety.

BACKGROUND OF THE INVENTION

This invention relates to methods of preparing purified boron nitride nanotubes (BNNT or BNNTs) and purified compositions of BNNT.

Due to their unique mechanical and thermal properties, interest in BNNT has grown dramatically over the past two decades. Like carbon nanotubes, BNNTs display exceptional strength. Despite being electrically insulating semiconductors, BNNTs possess high thermal conductivity. They are promising materials for many applications.

Realization of these promising applications has been hindered by significant challenges in BNNT synthesis and purification which has proven far more difficult, for example, than carbon nanotubes (CNTs). For example, in WO20181024231 A1, Dushatinski describes problems with prior art synthesis and purification approaches for BNNT. Depending on the synthesis conditions, as-synthesized BNNTs have substantial amounts of small boron-containing particles in the form of boron, amorphous boron nitride (a-BN), and hexagonal boron nitride (h-BN). Depending on the synthesis conditions, these small boron-containing particles can account for 5% to 95% of the mass of the as-synthesized materials.

These impurities are problematic, as, for example, they can reduce the BNNT surface area, reduce strength, and/or reduce thermal conductivity of the BNNT materials. These impurities can further compromise the interface of BNNTs with other materials and thus diminish their ability to be dispersed, and/or to transfer mechanical load and heat across such interfaces in nanocomposites, with the consequence of reduced structural and thermal performance of the BNNT composites.

Accordingly, methods have been sought for purification of as-synthesized BNNTs. Methods for removing boron and boron oxides are known in the prior art and have been reasonably effective. In contrast, prior art methods have been deficient in removing h-BN, which is challenging to remove from impure BNNTs (due to its chemical similarity with BNNTs), without damaging the BNNTs. These prior art methods can be costly, time-intensive, can reduce yields of BNNTs, and can damage BNNTs.

There is a need in the art for a method that virtually completely removes h-BN impurities without damaging the BNNTs, and there is a need in the art for high-purity BNNT compositions.

SUMMARY OF THE INVENTION

The present disclosure relates to novel compositions of boron nitride nanotubes, and methods to produce said compositions. More specifically, the present disclosure relates to a method for the removal of boron nitride impurities and h-BN sheets from BNNT compositions using a low-temperature, non-destructive, hydrocarbon solvent-based method for the purification of impure BNNTs. The present disclosure relates to purified boron nitride nanotubes having a mass ratio of boron nitride nanotube to hexagonal boron nitride exceeding 100. A process is provided for producing said purified BNNT compositions comprising: (a) mixing an impure BNNT sample with a hydrocarbon solvent; (b) heating said mixture of said impure BNNT sample and said hydrocarbon solvent for a period of time; and (c) separating said hydrocarbon solvent from said BNNT sample; wherein said step of heating is performed at a temperature within 50 BC of the boiling point of said hydrocarbon solvent, wherein said heating is performed for a period exceeding five minutes, and wherein said hydrocarbon solvent comprises one or more hydrocarbons possessing at least 5 carbon atoms and no more than 11 carbon atoms.

Suitable hydrocarbon solvents include C5 to C11 alkanes, C5 to C11 cycloalkanes, C5 to C11 alkenes, C5 to C11 cycloalkenes, C5 to C11 isoalkanes, and mixtures thereof. For example, suitable C5 to C11 alkane hydrocarbon solvents include pentane, hexane, heptane, octane, nonane, and decane. In some embodiments, heptane is the hydrocarbon solvent. While other compounds can be included in the C5 to C11 hydrocarbon solvent, whether intentionally or unintentionally, the concentration of C5 to C11 hydrocarbons in the C5 to C11 hydrocarbon solvent must be at least 90% by weight.

In some preferred embodiments, during the step of heating the hydrocarbon solvent with the BNNT material, the heating temperature is the boiling point of the hydrocarbon solvent. In other embodiments, the mixture must be heated to at least 70 °C. In some embodiments, the heating temperature is within 50 °C of the boiling point of the hydrocarbon solvent, or within 25 °C, or within 10 °C. In all suitable embodiments, the temperature is below 300 °C, and preferably below 200 °C. In some embodiments, the temperature is below 175 °C, or below 150 °C, or below 125 EC, or below 100 °C.

In some embodiments, the step of heating is performed in a pressure vessel. In other embodiments, the purification is performed in a Soxhlet apparatus, or a suitable flask with a condenser, or simply by exposing the BNNT to the hydrocarbon vapor in any suitable container. Use of agitation, including sonication, can be used to enhance the process.

In some embodiments, the BNNT can be separated from the hydrocarbon solvent simply by pouring off, decanting, or filtering the solvent.

The purified BNNT compositions described herein are substantially free of h-BN impurities. Such h-BN impurities are known in the art to be very difficult to remove from impure BNNT samples. More specifically, the purified boron nitride nanotubes, as described herein, have a mass ratio of boron nitride nanotube to hexagonal boron nitride exceeding 100. In other words, any boron atom in the purified BNNT is roughly 100 times more likely to be incorporated into a boron nitride nanotube than in hexagonal boron nitride. In some embodiments, the purified boron nitride nanotubes have a molar ratio of boron nitride nanotube to hexagonal boron nitride exceeding 200, or 300, or 400, or 500, or 1,000. In typical embodiments, the purified boron nitride nanotubes have a BNNT/h-BN X-ray diffraction spectral ratio of at least 100.

The purified BNNT compositions described herein can be used, for example, to enhance the mechanical and thermal conductivity of polymer composites. BNNT is known through theoretical and experimental reports to be 60 times stronger than steel. Thus, the addition of small quantities of BNNT to a high performance polymer such as an epoxy or polyimide has the potential to significantly increase the mechanical performance properties of the part. BNNT has six times the thermal conductivity of copper but, unlike most highly thermally conductive materials, it is an electrical insulator. Removal of heat is the major factor limiting the development of smaller and more powerful electronic devices. Addition of BNNT to polymers used to support high power diodes would make it possible to conduct heat away from the diode. Thus, electronic components can potentially be made much more powerful and much smaller.

BRIEF DESCRIPTION OF DRAWINGS

The summary above, and the following detailed description, will be better understood in view of the drawings which depict details of preferred embodiments.

FIG. 1A shows a field emission scanning electron microscopy (FESEM) image of as-synthesized BNNT prior to purification. FIG. 1B shows an FESEM image of BNNT after purification according to the methods described herein. FIG. 1C shows an FESEM image of heptane purification residue removed from as-synthesized BNNT, and FIG. 1D shows a higher magnification FESEM image of heptane purification residue removed from as-synthesized BNNT.

FIG. 2A compares an XRD image of as-produced BNNT with literature XRD values of h-BN, showing that the as-produced BNNT has a sharp shoulder peak around 26.69° which is consistent with the literature peak of h-BN at 26.63°. FIG. 2B compares XRD images of as-produced BNNT with purified BNNT, and demonstrates the absence of the sharp shoulder peak at 26.69° in the purified BNNT.

DETAILED DESCRIPTION OF THE INVENTION

Figure 2A:
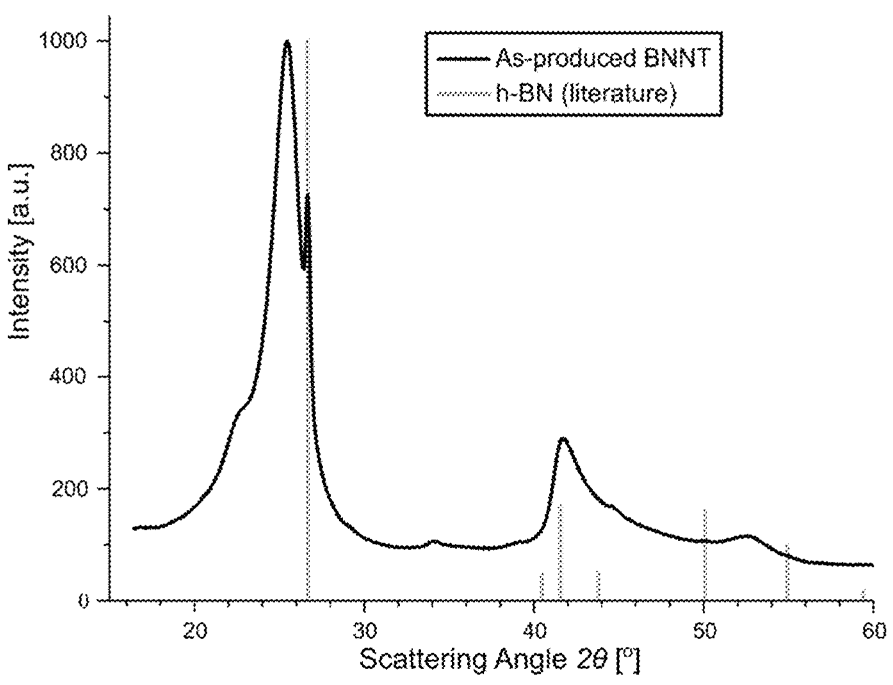
FIGS. 2A and 2B show overlaid X-ray diffraction (XRD) patterns of as-produced BNNT and purified BNNT.

At The present disclosure is directed to purified boron nitride nanotube compositions and methods for producing such compositions.

The term "boron nitride nanotube(s)", abbreviated BNNT or alternatively BNNTs, refers to cylindrical boron nitride structures with sub-micrometer diameters and lengths exceeding 1 micrometer. They are a polymorph of boron nitride, and have a theoretical boron to nitrogen atomic ratio of one. Boron nitride nanotube compositions are produced with significant levels of impurities, including boron, amorphous boron nitride, and hexagonal boron nitride. The term "hexagonal boron nitride", abbreviated as h-BN, includes both h-BN nanocages and h-BN nanosheets.

The term "as-produced boron nitride nanotubes", also referred to as "as-synthesized boron nitride nanotubes" and abbreviated as "as-produced BNNT", means compositions of BNNT that have been produced but have not been substantially freed from all impurities.

The term "purified boron nitride nanotube compositions", abbreviated as "purified BNNT", means BNNT compositions purified such that any boron atom in the purified BNNT composition is 100 times more likely to be incorporated into a boron nitride nanotube than into hexagonal boron nitride.

The purification ratio can be determined by analyzing X-ray diffraction spectra. More specifically, the BNNT/h-BN X-ray diffraction spectral peak ratio refers to the ratio of the peak height (a.u.) at the main peak of the XRD spectrum for BNNT (around 25.4°) to the peak height (a.u.) at the shoulder peak around 26.69°.

Any BNNT compositions can be used as starting materials. Such BNNTs can be produced using any methods suitable for producing BNNTs, including but not limited to high-temperature/pressure (HTP) methods, hydrogen-assisted BNNT synthesis (HABS), extended-pressure inductively-coupled plasma (EPIC), and ball milling/annealing.

The present disclosure relates to purified boron nitride nanotubes having a mass ratio of boron nitride nanotube to hexagonal boron nitride exceeding 100. A process is provided for producing said purified BNNT compositions comprising: (a) mixing an impure BNNT sample with a hydrocarbon solvent; (b) heating said mixture of said impure BNNT sample and said hydrocarbon solvent for a period of time; and (c) separating said hydrocarbon solvent from said BNNT sample; wherein said step of heating is performed at a temperature within 50° C of the boiling point of said hydrocarbon solvent, wherein said heating is performed for a period exceeding five minutes, and wherein said hydrocarbon solvent comprises one or more hydrocarbons possessing at least 5 carbon atoms and no more than 11 carbon atoms.

In some embodiments, said step of heating is performed in a pressure vessel that can permit pressures many times atmospheric pressure. Alternatively, the purification can be performed in a Soxhlet apparatus, or a suitable flask with a condenser, or simply by exposing the BNNT to the hydrocarbon vapor in any suitable container.

Suitable hydrocarbon solvents include C5 to C11 alkanes, C5 to C11 cycloalkanes, C5 to C11 alkenes, C5 to C11 cycloalkenes, C5 to C11 isoalkanes, and mixtures thereof. For example, suitable C5 to C11 alkane hydrocarbon solvents include pentane, hexane, heptane, octane, nonane, and decane. In some embodiments, heptane is the hydrocarbon solvent. While other compounds can be included in the C5 to C11 hydrocarbon solvent, whether intentionally or unintentionally, the concentration of C5 to C11 hydrocarbons in the C5 to C11 hydrocarbon solvent must be at least 90% by weight.

For example, pentane is an effective solvent for BNNT purification when used according to the methods described herein. Hydrocarbons shorter than pentane are gases at room temperature.

The C12 hydrocarbon dodecane was ineffective when used in an attempt to purify BNNTs. Raman spectroscopy showed that h-BN was not removed from a BNNT sample treated with dodecane according to the methods described herein. More polar solvents such as isopropanol were also found to be ineffective.

Without wishing to be bound by theory, it is believed that the vapor pressure of the heated solvent is suitable to liberate the impurities from the BNNT structure, leaving purified BNNT. This process is particularly effective for purifying away h-BN. For example, hydrocarbon molecules can diffuse into cleavage spaces between planar h-BN and curved BNNT, and the trapped hydrocarbon can exert pressure to drive apart the h-BN and the BNNT. Alternatively, hydrocarbon molecules can diffuse into the interior of a BNNT, and increased pressure can induce small changes in the tube conformation, potentially releasing impurities in the process.

Accordingly, it is important to have significant vapor pressure. In some embodiments, the solvent is heated such that the vapor pressure of the solvent exceeds 300 mm Hg, or exceeds 400 mm Hg. In some preferred embodiments, during the step of heating the hydrocarbon solvent with the BNNT material, the heating temperature is the boiling point of the hydrocarbon solvent. In other embodiments, the mixture must be heated to at least 70 ⍰C. In some embodiments, the heating temperature is within 50 ⍰C of the boiling point of the hydrocarbon solvent, or within 25 ⍰C, or within 10 ⍰C.

If the pressure is too high, the BNNT can be destroyed, as is described later in Example 2 in the specification. Accordingly, there is a vapor pressure range for which the purification process is particularly effective. That vapor pressure range when the solvent is heptane is between about 300 mm Hg and 1,150 mm Hg, preferably between about 350 mm Hg and 1,000 mm Hg, or between about 400 mm Hg and 900 mm Hg. The pressure can be cycled such that BNNTs are subjected to fluctuations in pressure, which can facilitate sequential contraction and relaxation of the BNNTs.

The duration of heating at the requisite temperature is at least five minutes, and can be any longer duration that provides the desired purification without substantial damage to the BNNTs. For example, the heating can be performed for at least five minutes, or at least ten minutes, or at least 30 minutes. The heating can be performed in one event, or can be performed in a cyclic heating pattern comprising alternate heating and cooling. Use of agitation such as sonication during heating can be used to enhance the process.

EXAMPLES

The examples that follow are intended in no way to limit the scope of this invention but are provided to illustrate representative embodiments of the present invention. Many other embodiments of this invention will be apparent to one skilled in the art.

Example 1

As-produced BNNT material was synthesized using a high temperature pressure method coupled with a procedure to remove boron impurities. The as-produced BNNTs were further purified as described below.

Removal of boron nitride and purification of BNNT was accomplished using the low temperature hydrocarbon procedure described herein. This procedure involved mixing 50 mg of as-produced BNNT with 15 ml of heptane (Sigma Aldrich, Raleigh, NC, USA) in a 21 mL Ace pressure tube (Ace Glass Incorporation, Vineland, NJ, USA). The system was heated and maintained at 90° C. for 5 hours in an oil bath. The system was cooled to room temperature before the pressure tube was opened. Heptane was separated from the BNNT sample by decantation. The purified BNNT was dried in a vacuum oven at −1 atm, 250° C. overnight. The decanted heptane solution containing the BN impurities was concentrated in the vacuum oven at 60° C. for further investigation.

Field emission scanning electron microscopy (FESEM) data was captured using Hitachi S-4700 field emission scanning electron microscope. The samples were then dispersed in isopropanol, pipetted onto graphite tape, spin dried, and sputter coated.

Raman data was collected using a Renishaw inVia dispersive Raman spectrometer using 514 nm with excitation power 10-20 mW and a 100× objective with an N.A. of 0.65. The sample preparation for the residual impurities was done by drop casting the concentrated heptane solution on a cleaned silicon wafer. The Raman spectrum had a broad background peak over the range 500-7000 cm-1 that was due to fluorescence. Using MATLAB software, this background data was fitted using second order polynomial and subtracted. To get rid of noise, the data was subsequently smoothed using 10-point averaging. The purified BNNT signal noise was calculated using root mean square method (RMS) to define the detection limit of the technique.

X-ray diffraction (XRD) analysis was performed using a Bruker SMART APEX II diffractometer equipped with an APEX II CCD Detector and a copper K$\alpha$ source (wavelength $\lambda$=1.54 Å). The samples were prepared by compressing 20 mg of material into 3 mm discs. Due to the inhomogeneity of the BNNT samples, different locations on the BNNT disc were measured. The XRD pattern signal noise was calculated using the root mean square method (RMS) which enabled us to define the detection limit of the technique to be impressively low, between 0.2-0.4%.

Field emission scanning electron microscopy (FESEM) was conducted before and after the purification. As seen in FIG. 1A, the as-produced BNNT consists of multiple nanoscale tube networks that entangle and extend to microns in length. This structure is generally understood to be result of the BNNT growth process which has been hypothesized to originate from droplets of pure boron contained in fullerene-like BN cages ("nano-cocoons"). The larger impurities seen entangled within BNNTs may be the remnants of these BN nano-cocoons and BN nanoparticles, or they could be other impurities. As seen in FIG. 1A, these impurities (which appear as bumps along the long tubes) form aggregates on the tube surface and nodes. FIG. 1B shows the BNNTs after purification according to the methods described above. Visual impurities on the surface of the BNNTs are nearly absent, in stark contrast to FIG. 1A. Note that the BNNTs also appear to be thinner after the purification treatment.

Analyzing the decanted cleaning residue collected after drying the heptane filtrate yielded important insight into the composition of the material removed from the nanotubes via the purification method. FESEM analysis suggests that the impurities consisted of an abundance of small particles. FIG. 1C shows a representative FESEM image of a micron-sized particle hinting at a stacked surface structure. A higher-resolution FESEM image of the material is shown in FIG. 1D.

Figure 2B:
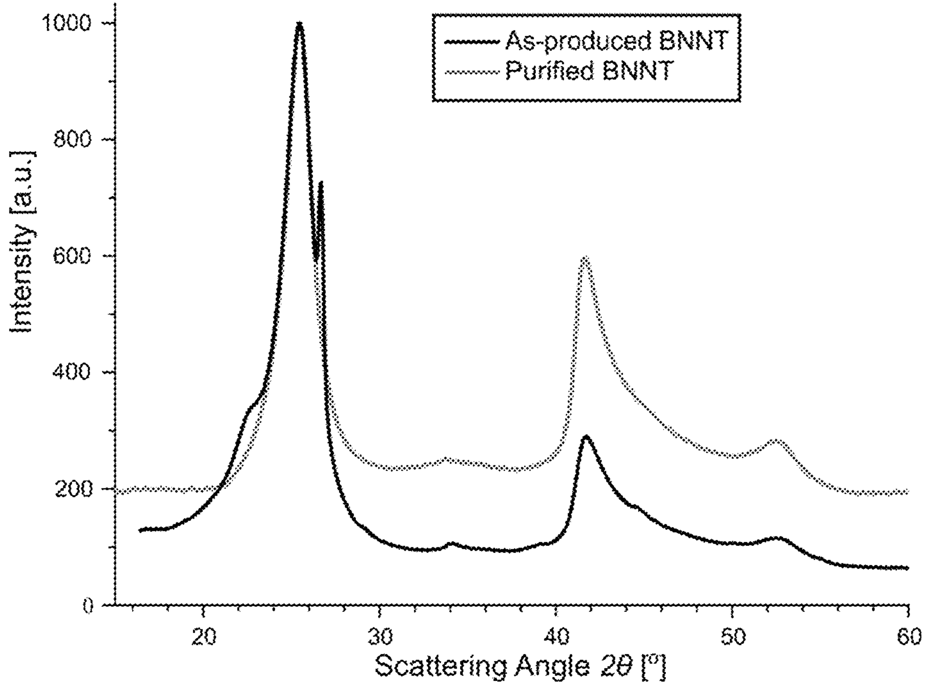

To further understand the cleaning process, we carried out X-ray diffraction (XRD) of the BNNT material before and after cleaning, which is shown in FIG. 2. The as-produced BNNT X-ray pattern shown in both FIG. 2A and FIG. 2B has a pronounced series of peaks in the range $2\theta$=20°-30°, corresponding to d-spacings in the range 4.43 Å-2.97 Å. This range overlaps well with literature values for inter-layer spacings within multi-layer, 2D materials such as graphite or h-BN. The spectrum features a second series in the range $2\theta$=40°-55°, corresponding to d-spacings in the range 2.25 Å-1.67 Å, likely representing the intra-layer spacings between the atoms of the in-plane honeycomb lattice.

The first peak series was analyzed using Lorentzian peak fitting, with the main peak at 25.33° and a sharp sub-peak on the right (26.69°) with FWHMs of 2.30° and 0.18°, respectively. To help interpret the measured BNNT peak positions, we overlaid h-BN peaks based on literature values as shown in FIG. 2A. There is a remarkable agreement between the position of the sharp 26.69° BNNT sub-peak on the right of the as-produced BNNT and the h-BN peak at 2θ=26.63°. The presence of this h-BN peak suggests that the as-produced BNNT contained a significant amount of h-BN.

When XRD was carried out on the purified BNNT compositions (purified using heptane as a solvent in accordance with the methods of the disclosure), we found that the main peak retained virtually the same position, shifting slightly to 25.46° (with a narrower FWHM 1.82°) as shown in FIG. 2B, which overlays the spectra of purified BNNT and as-produced BNNT. Importantly, the sharp sub-peak at 26.69° was absent in the purified BNNT spectrum, suggesting that the methods described herein removed virtually all of the h-BN from the as-produced BNNT. In the 2θ=40°-55° range, the spectra of the as-produced and purified materials look very similar, indicating that the in-plane lattice of the purified BNNT is not significantly altered by the purification procedure described herein.

To assess the presence of remaining h-BN and/or quantify the degree of h-BN removal, a Gaussian was fitted to the dominating main peak of the purified sample and subtracted from the purified XRD spectrum in FIG. 2. This procedure allowed us to inspect all remaining features in the spectrum at greater amplification. Nevertheless, the XRD peak at 26.69° was not detectable above the general noise level of approximately 0.5 intensity units (RMS noise). Having verified the absence of this h-BN peak, more investigation was conducted to quantify the sensitivity of the XRD measurement and to define the detection limit of the XRD technique. First, the peak heights were determined using Gaussian fitting and are shown in Table 1. Then, the noise of the purified BNNT pattern was determined using the root mean square method (RMS). The height of the second Gaussian peak of the as-produced BNNT was compared to the noise RMS. Using the ratio of the noise to the peak height indicates that the h-BN detection limit is 0.002. The absence of this sub-peak around 26.69▯ in the XRD spectrum of the purified BNNT shows that the purification method described herein succeeded in removing at least 99.8 percent of the h-BN impurities.

TABLE 1

XRD fitting parameters

| Sample ID | Peak | Peak position [°] | FWHM [°] | Height [a.u.] | $R^2$ |
|---|---|---|---|---|---|
| As-produced | Main | 25.33 | 2.30 | 1000.0 | 0.94 |
| BNNT | h-BN | 26.69 | 0.18 | 284.1 | |
| Purified BNNT | Main | 25.42 | 1.82 | 1000.0 | 0.98 |

In this example, the as-produced BNNT had a BNNT/h-BN X-ray diffraction spectral peak ratio of 3.52 (i.e., the ratio of the heights of the main peak to the h-BN peak, corresponding to 1,000 divided by 284.1). The purified BNNT has a BNNT/h-BN X-ray diffraction spectral peak ratio of at least 1,000 (i.e., the peak height of 1,000 a.u. at the main BNNT peak of 25.42▯ divided by the h-BN peak height which was not distinguishable above the general noise level of 0.5 a.u.).

We further analyzed the effectiveness of our purification technique to remove h-BN using non-resonant Raman spectroscopy with an excitation wavelength λ=514 nm (the expected bandgap of BNNTs is 5.5 eV, corresponding to a photon wavelength of 225 nm, while for h-BN the corresponding wavelength is 215 nm). According to literature (Nemanich, R J et al., "Light scattering study of boron nitride microcrystals". Physical Review B 23, 6348-6356 (1981)), h-BN is expected to feature a pronounced peak at 1365 cm-1, whereas BNNTs have been shown not to feature this peak in non-resonant Raman spectroscopy.

Figures 3A, 3B:
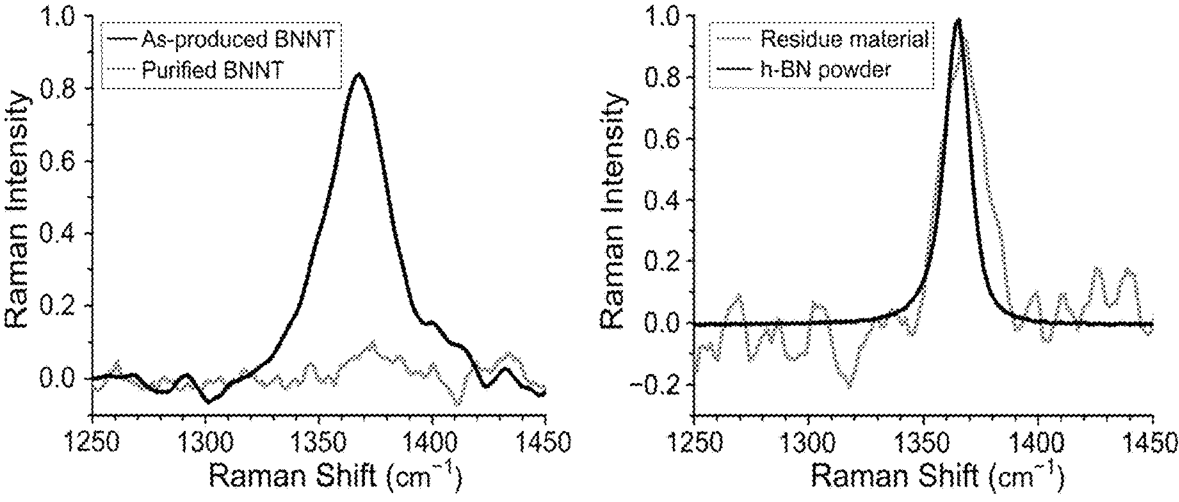
FIG. 3A shows overlaid Raman spectra of purified BNNT and as-produced BNNT, demonstrating the lack of a pronounced peak around 1366 cm-1 in the purified BNNT.
FIG. 3B shows overlaid Raman spectra of h-BN powder and residue material removed from as-produced BNNT during the purification process, both of which have a strong peak in the 1366 cm-1 region.

FIG. 3A shows overlaid Raman spectra of (i) as-produced BNNT and (ii) purified BNNT. The spectrum of the as-produced BNNT has one pronounced peak, located at 1368.5 cm-1, while the purified BNNT featured no peak in this spectral region. FIG. 3B shows overlaid spectra of (i) h-BN and (ii) the purification residue removed from as-produced BNNT when purified using the methods disclosed herein. Each spectrum features one pronounced peak, located at 1364.6 cm-1 and 1367.4 cm-1, respectively. Table 2 lists the corresponding peak positions and full widths at half maximum (FWHM) from the peak fitting parameters of the Raman peaks. The observed h-BN peak at 1364.6 cm-1 is in excellent agreement with the literature value.

TABLE 2

Raman FWHM and peak position based on peak fitting

| Sample | FWHM [$cm^{-1}$] | Peak position [$cm^{-1}$] | $R^2$ |
|---|---|---|---|
| h-BN | 12.5 | 1364.6 ± 0.1 | 0.99 |
| Residue material | 26 | 1367.4 ± 0.2 | 0.97 |
| As-Produced BNNT | 36 | 1368.5 ± 0.2 | 0.98 |

The Raman data for the as-produced BNNT (FIG. 3A) shows a symmetric peak similar to the peak in the h-BN and residue material. The BNNT has no peak in the non-resonance Raman, suggesting that the as-produced BNNT contains h-BN impurities, which is further support for the XRD findings described above. Furthermore, the peak position of the residue peak is very close to the h-BN peak, which suggests that the collected purification residue contains the removed h-BN impurities. Interestingly, the peak position did not change much between the as-produced material (1368.5 cm-1) and the residue (1367.4 cm-1), suggesting that the size of the h-BN particles was not altered much during the purification procedure. Thus, we can conclude from our Raman analysis that the as-produced BNNTs contain h-BN, and that our purification procedure removes substantially all of the h-BN, which is in full agreement with the XRD results.

Example 2

As-produced BNNT material was synthesized using a high temperature pressure method coupled with a procedure to remove boron impurities. The as-produced BNNTs were further purified as described below.

Figures 4A, 4B:
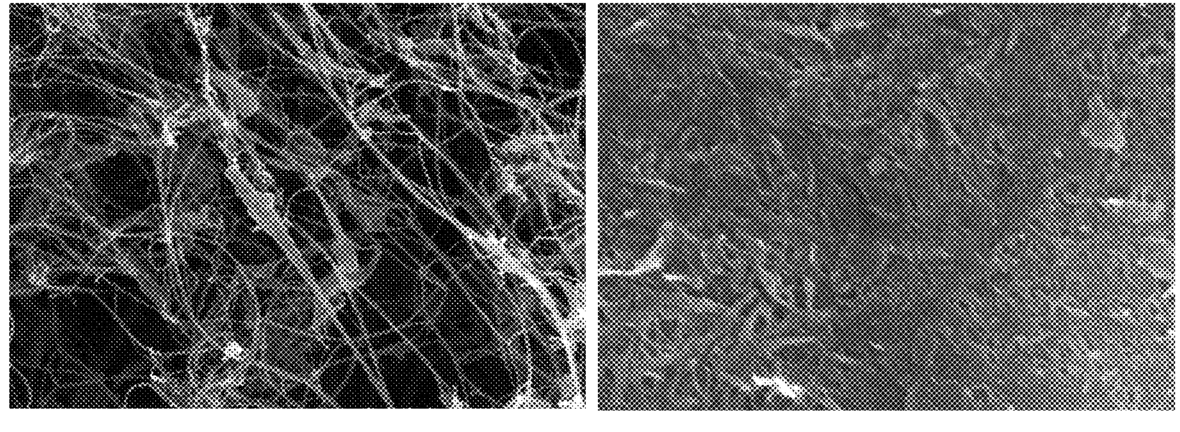
FIG. 4A shows an FESEM image of a BNNT sample prior to a higher temperature heptane purification procedure.
FIG. 4B shows an FESEM image of the BNNT sample after the higher temperature heptane procedure which damaged the BNNTs.

To test the range of the purification procedure described herein, as-produced BNNT was mixed with heptane (Sigma Aldrich, Raleigh, NC, USA) in an Ace pressure tube (Ace Glass Incorporation, Vineland, NJ, USA). The system was heated and maintained at 120° C. for 5 hours in an oil bath, corresponding to a projected pressure of 1187 Torr (1.56 atm). The system was cooled to room temperature before the pressure tube was opened. Heptane was separated from the BNNT sample by decantation. FIG. 4A shows an FESEM image of the BNNT sample before the heptane purification procedure, while FIG. 4B shows an FESEM image of the BNNT sample after the heptane procedure. FIG. 4B shows that the BNNTs shown in FIG. 4A were damaged by the relatively high pressure and temperature heptane procedure used in this example.

INCORPORATION BY REFERENCE

All publications, patents, and patent applications cited herein are hereby expressly incorporated by reference in their entirety and for all purposes to the same extent as if each was so individually denoted.

EQUIVALENTS

While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

The articles "a" and "an" are used herein to refer to one or to more than one (i.e. to at least one) of the grammatical object of the article. By way of example, "a boron nitride nanotube" means one boron nitride nanotube or more than one boron nitride nanotube.

The invention claimed is:

1. A method for producing purified boron nitride nanotube compositions comprising the steps of:

mixing an impure BNNT sample with a hydrocarbon solvent;

heating said mixture of said impure BNNT sample and said hydrocarbon solvent for a period of time; and separating said hydrocarbon solvent from said BNNT sample;

wherein said step of heating is performed at a temperature within 50° C. of the boiling point of said hydrocarbon solvent, wherein said heating is performed for a period exceeding five minutes, and wherein said hydrocarbon solvent comprises one or more hydrocarbons possessing at least five carbon atoms and no more than eleven carbon atoms.

2. The method of claim 1, wherein said hydrocarbon is heated such that its vapor pressure is at least 300 mm Hg, and less than 1,150 mm Hg.

3. The method of claim 1, wherein said purified boron nitride nanotube compositions have a mass ratio of boron nitride nanotubes to hexagonal boron nitride exceeding 100.

4. The method of claim 1, wherein said purified boron nitride nanotube compositions have a BNNT/h-BN X-ray diffraction spectral peak ratio of at least 100.

5. The method of claim 1, wherein said purified boron nitride nanotube compositions have a BNNT/h-BN X-ray diffraction spectral peak ratio of at least 100 and lack a significant Raman spectrum peak in the 1366 $cm^{-1}$ region.

* * * * *